United States Patent
Knauss

(10) Patent No.: US 6,843,467 B2
(45) Date of Patent: Jan. 18, 2005

(54) FLAP VALVE

(75) Inventor: Uwe Knauss, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 10/221,724

(22) PCT Filed: Jan. 15, 2002

(86) PCT No.: PCT/DE02/00096
§ 371 (c)(1), (2), (4) Date: Dec. 26, 2002

(87) PCT Pub. No.: WO02/055914
PCT Pub. Date: Jul. 18, 2002

(65) Prior Publication Data
US 2003/0111630 A1 Jun. 19, 2003

(30) Foreign Application Priority Data
Jan. 16, 2001 (DE) .......................... 101 01 657
Apr. 25, 2001 (DE) .......................... 101 20 120

(51) Int. Cl.⁷ ............................................... F16K 5/06
(52) U.S. Cl. ...................... 251/306; 251/314; 123/337
(58) Field of Search ................................ 251/305, 306, 251/307, 308, 314; 123/336, 337

(56) References Cited

U.S. PATENT DOCUMENTS

| | | | | |
|---|---|---|---|---|
| 2,789,785 A | * | 4/1957 | Woods | 251/306 |
| 2,907,548 A | * | 10/1959 | Maas | 251/308 |
| 3,480,254 A | * | 11/1969 | Fawkes | 251/305 |
| 3,779,511 A | * | 12/1973 | Wenglar | 251/306 |
| 3,877,678 A | * | 4/1975 | Jung | 251/305 |
| 4,290,615 A | * | 9/1981 | Etcheverry | 251/306 |
| 5,531,205 A | * | 7/1996 | Cook et al. | 251/306 |
| 6,135,415 A | * | 10/2000 | Kloda et al. | 251/129.11 |
| 6,604,516 B1 | * | 8/2003 | Krimmer et al. | 251/306 |
| 6,659,427 B2 | * | 12/2003 | Krimmer et al. | 251/306 |

* cited by examiner

Primary Examiner—Eric Keasel
(74) Attorney, Agent, or Firm—Ronald E. Greigg

(57) ABSTRACT

In a flap valve for controlling a gas flow, with a valve tube that conveys the gas flow and a valve flap, which is disposed in the valve tube, is non-rotatably supported on an adjustable flap shaft, and can be pivoted between an open position that maximally unblocks the tube cross section and a closed position that blocks the tube cross section, in order to produce a high degree of tightness of the flap valve with the least possible torque, the tube end of the valve tube is inclined so that the circumferential tube edge is essentially disposed in a plane extending at an acute angle in relation to the tube axis. The valve flap has an approximately elliptical outer contour and is disposed in the valve tube at or near the inclined tube end so that its tube normal encloses an acute angle with the tube axis. The valve flap and/or the valve tube may be totally or partially embodied so that they can be elastically deformed and/or tilted.

24 Claims, 4 Drawing Sheets

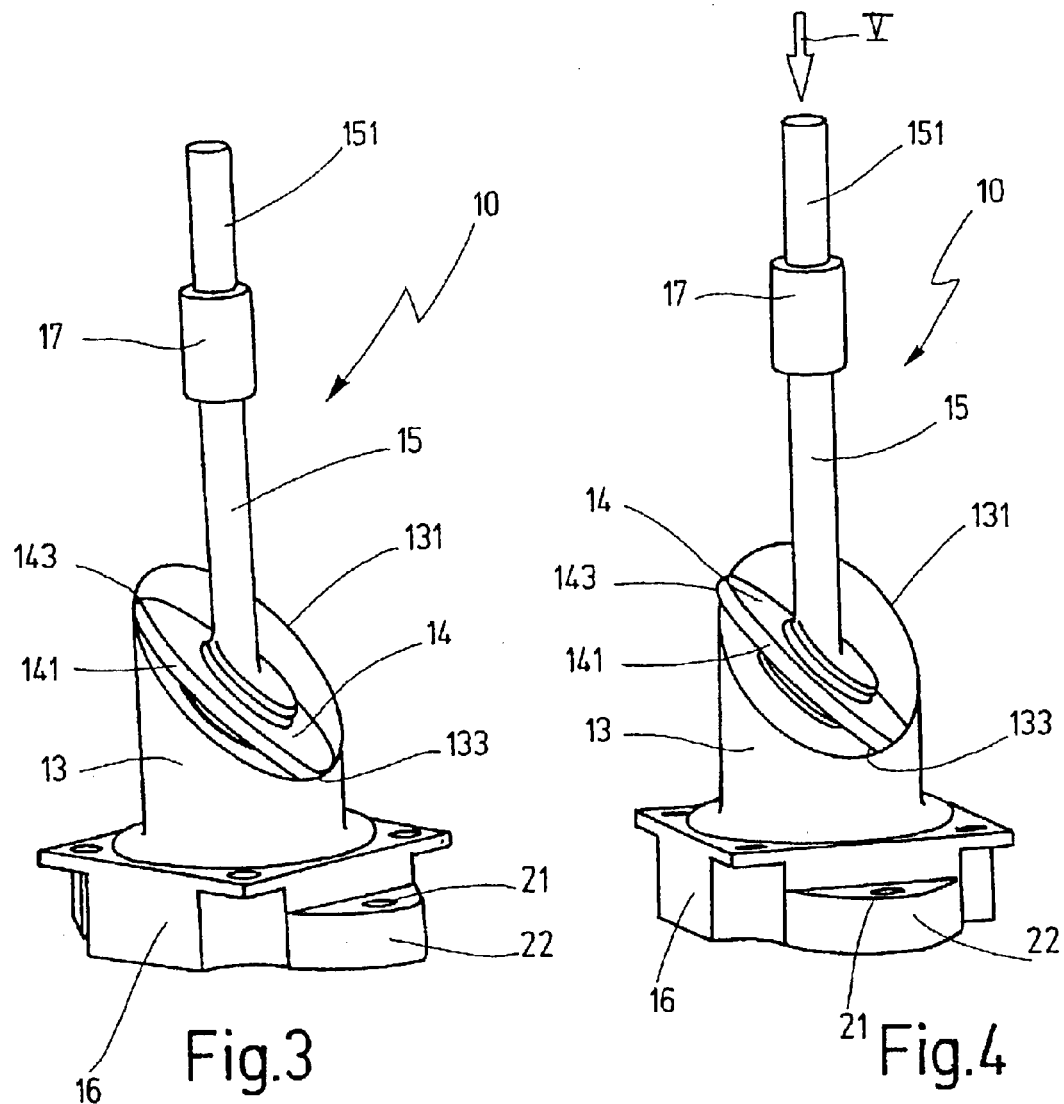
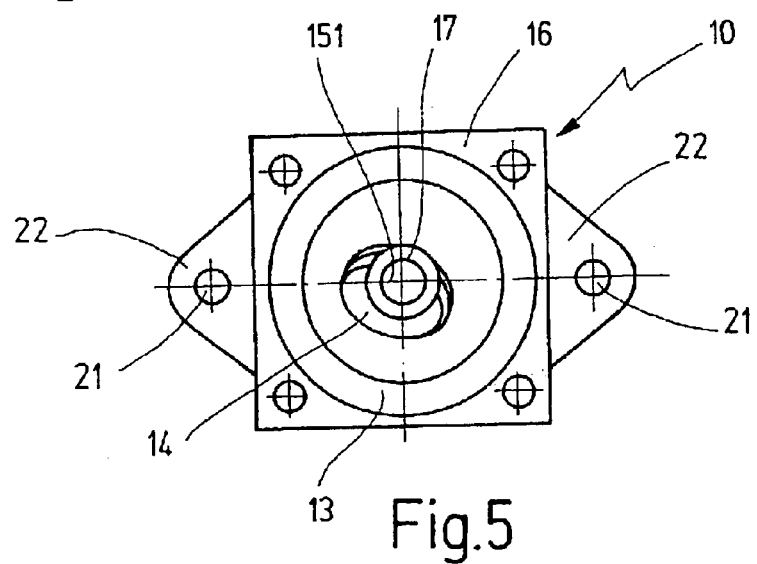

FLAP VALVE

CROSS-REFERENCE TO RELATED APPLICATIONS

This application is a 35 USC 371 application of PCT/DE 02/00096 filed on Jan. 15, 2002.

BACKGROUND OF THE INVENTION

1. Field of the Invention

The invention is directed to an improved flap valve for controlling a gas flow and more particularly to such a valve especially useful in controlling the flow in a gas flow system of an internal combustion engine.

2. Description of the Prior Art

In a known throttle valve for controlling a gas flow in an exhaust conduit of an internal combustion engine, disclosed in DE 43 05 123 A1, the flap shaft which supports the throttle valve and extends parallel to the flap surface of the throttle valve is supported at both ends by a bearing bore in the conduit wall of the exhaust conduit and respectively protrudes through a bearing sleeve there. In order to achieve a greater degree of tightness while avoiding a sluggishness of the flap actuation, the bearing sleeves, which are each axially prestressed by means of spring force in a respective bearing housing, can move in a radial direction inside the bearing housing, as a result of which the dimensional deviations between stop surfaces for the throttle valve, which are embodied on the conduit wall, and the flap shaft bearing are automatically compensated for when the throttle valve first closes.

The unpublished patent application DE 199 34 113.3 has already disclosed using a flap valve of the type mentioned at the beginning as an exhaust return valve for the metered admixing of exhaust into the aspirated fresh air in the intake section of an internal combustion engine. To this end, the casing of an intake tube of the intake section is provided with an opening into which the valve outlet of the flap valve is inserted in a gas-tight manner. With a flap shaft that is inclined in relation to the flap plane for flap adjustment, the valve flap is disposed in a thin-walled tube, which is inserted into the rigid valve tube with radial play and is fastened to the valve tube with a tube section. Through an appropriate shaping of the valve flap, in its closed position, the valve flap conforms to the inner wall of the elastic thin-walled tube and closes the tube cross section in a gas-tight manner so that a separate seal between the valve tube and the valve flap can be eliminated.

SUMMARY OF THE INVENTION

The flap valve according to the invention has the advantage of achieving a high degree of tightness during closing, with the least possible amount of torque. The flexibility of the valve tube and/or of the valve flap and also the tilting the valve tube and/or the valve flap produce a relatively balanced stress level in the flap valve during closing, which results in the fact that the flap valve has no mechanical stop within certain symmetrical boundaries despite the high degree of tightness. Due to the inclination of the tube end, a part of the flap contour is disposed outside of the valve tube during the movement of the valve flap, as a result of which only a partial contact is produced so that adjusting the valve flap requires only a very small amount of torque. Only during closing, when the flap geometry is approximately encompassed by the valve tube geometry, does the deformation and the tilting of the valve tube and/or the valve flap result in a slightly higher actuating moment. Moreover, through the selection of the flap inclination angle enclosed between the plane normal of the valve flap and the tube axis of the valve tube, a freely variable characteristic curve of the flap valve can be achieved with regard to the maximal through flow and small quantity metering. The smaller the flap inclination angle is, the less open cross section the flap valve unblocks due to the tube inclination. In addition, the inclination of the valve flap increases the pivot angle between its closed position and its maximal open position to 180° so that due to the larger pivoting path at the beginning of the opening motion and toward the end of the closing motion of the valve flap, a very sensitive small quantity metering is achieved.

According to an advantageous embodiment of the invention, the flap valve is inclined at an acute angle to the plane normal of the valve flap. A coincidence of the plane normal and the axis of the flap shaft must be prevented, as should an alignment of these two parts of right angles to each other. Preferably, the flap shaft is disposed so that its axis coincides with the tube axis.

According to an advantageous embodiment of the invention, the valve flap has an edge surface that constitutes its outer contour, which is convexly curved, i.e. is rounded in the direction of the plane normal of the valve shaft. This has the advantage that the valve tube, through deformation and/or tilting in the closed position, conforms in a form-fitting manner around the valve flap and can therefore produce a high degree of tightness without becoming permanently deformed as would be the case with a sharp-edged outer contour of the valve flap.

According to an advantageous embodiment of the invention, the valve tube, at least in the closing region of the valve flap, is designed to be elastically deformable and thin-walled. The dimensions of the outer contour of the valve flap are slightly greater than the dimensions of the inner contour of the valve tube in the closing region of the valve flap. As a result, the valve tube can favorably conform to the valve flap and at the same time, can also tilt to the side due to the various engagement points of the valve flap, which produces a very high degree of tightness. Varying the attachment of the tube in the tube end region oriented away from the inclined tube end can also be used to change the maximal closing moment and to change the increase behavior of the closing moment.

For the conforming of the valve tube to the valve flap, it is important that the wall thickness of the valve tube not be too great and that the inner diameter of the valve tube not be too small. By contrast, for strength and oscillation reasons, the wall thickness of the valve tube must not be too thin and the inner diameter of the valve tube must not be selected as too large. According to an advantageous embodiment of the invention, therefore, the thin-walled tube is embodied with a wall thickness between 0.05 mm and 2 mm and the inner diameter of the valve tube is selected to be between 5 mm and 200 mm.

According to an advantageous embodiment of the invention, the valve tube is embodied as corrugated in bellows fashion in a tube section spaced apart from the inclined tube end. This tube section encourages an inclination and tilting of the valve tube and consequently very reliably prevents a mechanical catching inside the flap valve, which leads to an improved embrace of the valve flap by the valve tube. The tilting of the valve tube permits the valve flap to spin without catching, despite having a greater outer contour than the inner contour of the inclined tube end. This makes it easier to control the flap valve and simultaneously minimizes the danger of mechanical jamming in the event of possible dimensional fluctuations in the valve flap, which have a less powerful impact anyway due to the inclination of the valve flap in relation to the valve tube.

The flap valve according to the invention is preferably used as an exhaust return valve in the exhaust return line of an internal combustion engine or as a throttle valve unit in the air supply line of an intake section of an internal combustion engine.

BRIEF DESCRIPTION OF THE DRAWINGS

The invention will be explained in detail herein below, in conjunction with an exemplary embodiment shown in the drawings, in which:

FIG. 5 shows a top view of the flap valve in the direction of arrow V in FIG. 4, FIGS. 6 and 7 show perspective depictions of a modified flap valve in two different pivot positions of the valve flap.

DESCRIPTION OF THE PREFERRED EMBODIMENTS

Figure 1:
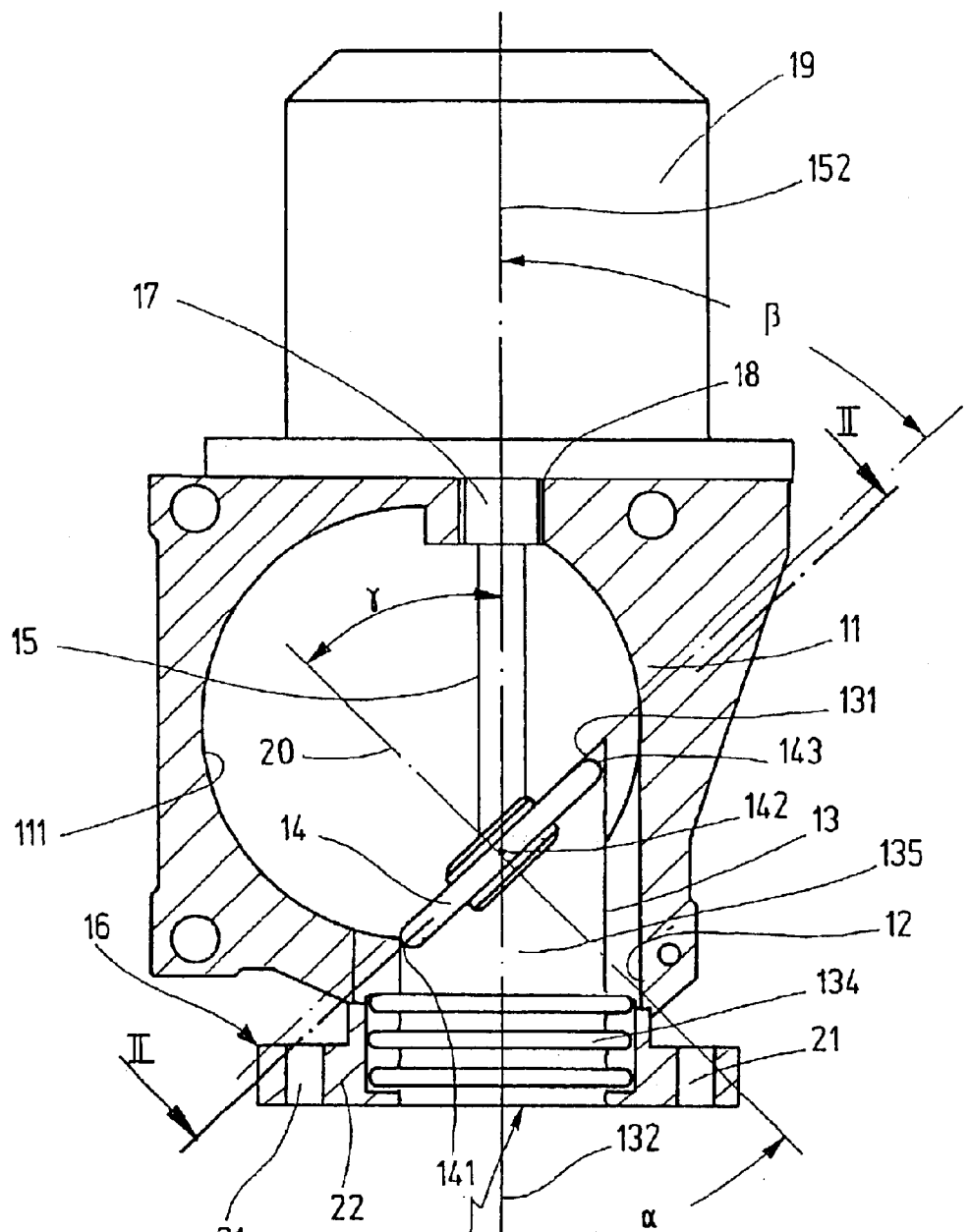
FIG. 1 shows a longitudinal section through a flap valve of the invention being used as an exhaust return valve.

In the exemplary embodiment of FIG. 1, the flap valve 10 shown in a perspective view in FIGS. 3, 4, 6 and 7 is used as an exhaust return valve in the intake section of an internal combustion engine. This intake section includes an intake tube 11, which is for air leading to the internal combustion engine and usually contains a throttle valve, not shown here, for controlling the air flow. The casing of the intake tube 11 has an opening 12 let into it, whose axis is aligned at right angles to the axis of the intake tube 11.

The flap valve 10 shown in a longitudinal section in FIG. 1 and in perspective views in FIGS. 3 and 4 has a thin-walled, flexible, possibly elastically deformable valve tube 13 with a controllable tube cross section 135 and a valve flap 14, which is disposed in the valve tube 13, is fastened to the end of a flap shaft 15 and, through rotation of the flap shaft 15, can be pivoted between an open position that unblocks the maximal tube cross section 135 of the valve tube 13 and a closed position that closes the tube cross section 135 of the valve tube 13 (FIG. 1). The tube end of the valve tube 13 is affixed in a valve socket 16, which can be connected to the intake tube 11. The valve socket 16 is provided with a flange 22 that is embodied with fastening holes 21 for the attachment of an exhaust return line. The tube section 134 of the valve tube 13 that is inserted into the valve socket 16 is embodied in the form of a bellows so that there is a certain amount of flexibility in the fastening region, permitting the valve tube 13 to tilt in relation to the flap shaft 15. The free tube end of the valve tube 13 oriented away from this tube end is inclined so that the circumferential tube edge 131 is disposed in a plane that extends at an acute angle β in relation to the tube axis 132 of the valve tube 13. This angle β will be referred to below as the tube inclination angle β.

After the flap valve 10 is inserted into the opening 12 of the intake tube 11 and the valve socket 16 is attached, the valve tube 13 protrudes past the inner wall 111 of the intake tube 11. Preferably, the edge point 133 of the tube edge 131 that is recessed the furthest axially from the tube end is disposed directly on the inner wall 111 of the intake tube 11.

The flap shaft 15, which supports the valve flap 14 at its end, is contained in rotary fashion with a bearing part 17 in a bearing bore 18, which passes through the casing of the intake tube 11, and protrudes out of the intake tube 11 with its shaft end 151. A servomotor 19 fastened to the intake tube 11 engages the shaft end 151 in order to actuate the flap valve 10. In the exemplary embodiment of FIGS. 1 to 4, the flap shaft 15 is aligned coaxial to the tube axis 132 of the valve tube 13. It can, however, also be inclined in relation to the tube axis 132 by up to 5°, where in principle, an acute angle γ, which is referred to below as the shaft inclination angle γ, must be maintained between the axis 152 of the flap shaft 15 and the plane normal 20 of the valve flap 14 (FIG. 1).

Figure 2:
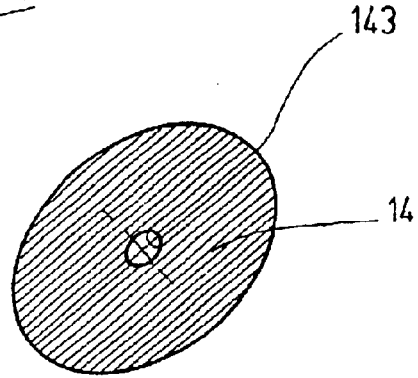
FIG. 2 shows a section along line II—II of a valve flap in the flap valve according to FIG. 1, FIGS. 3 and 4 each show a perspective depiction of the flap valve in two different pivot positions of the valve flap.
Figure 6:
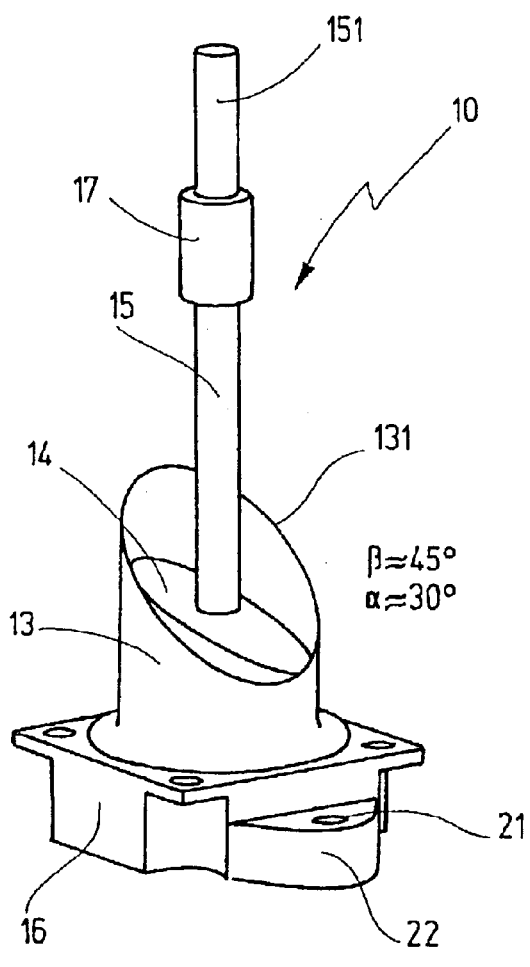
Figure 7:
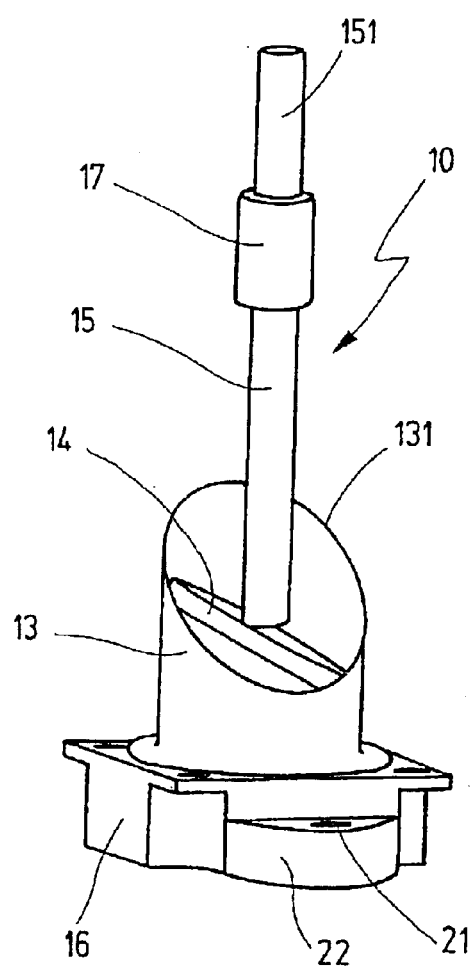

As is clear from the sectional depiction in FIG. 2, the valve flap 14 has an elliptical or approximately elliptical outer contour and is disposed in the valve tube 13 at or near the inclined tube end so that its plane normal 20 encloses an acute angle α, referred to below as the flap inclination angle α, with the tube axis 132 (FIG. 1). As shown in FIG. 1, the outer contour of the valve flap 14 in the direction of the plane normal 20 is rounded in such a way that the edge surface 141 of the valve flap 14, which edge defines the outer contour, is convexly curved (FIG. 1). This rounding of the edge surface 141 permits the flexible, thin-walled valve tube 13 to embrace the valve flap 14 in the closed position of the valve flap 14 without permanent deformation of the valve tube 13. The flap inclination angle α, which is enclosed by the plane normal 20 of the valve flap 14 and the tube axis 132, and the tube inclination angle β, which is enclosed between the plane of the inclined tube end and the tube axis 132 (FIG. 1), can be freely selected independently of each other; the selection range for the flap inclination angle α is between 10 and 890 the selection range for the tube inclination angle β is between 30 and 850. The insertion depth of the valve flap 14 into the valve tube 13 must be set in accordance with the selected angles α and β. For example, if the flap inclination angle α is selected as greater than the tube inclination angle β, then the insertion depth of the valve flap 14 into the valve tube 13 must be increased. The normal case is shown in the exemplary embodiment in FIGS. 1 to 4. In this exemplary embodiment, the flap inclination angle α and the tube inclination angle β are each 45°. In the exemplary embodiment in FIGS. 6 and 7, the flap inclination angle α is approximately 30° and the tube inclination angle β is approximately 45° The pivoting point 142 of the valve flap 14, which point is located at the front end of the flap shaft 15, is always disposed inside the valve tube 13 and in order to assure the closed position of the valve flap 14, is spaced axially apart from the inclined tube end. This axial distance, which determines the insertion depth of the inclined valve flap 14 into the valve tube 13, can be arbitrarily selected, but must always be dimensioned so that the edge point 143, which is located the furthest forward toward the tube end on the outer contour of the inclined valve flap 14, is always disposed in front of the furthest recessed edge point 133 of the tube edge 131 in all pivot positions of the valve flap 14 (FIGS. 3 and 4). Maintaining the size of this distance assures that the valve flap 14 can rotate out from the valve tube 13 and that the flap valve 10 is still able to unblock the tube cross section in its open position. But the greater the axial distance from the inclined tube end is, the smaller the maximal through flow quantity in the open position of the flap valve 10 is.

Figures 9, 10:
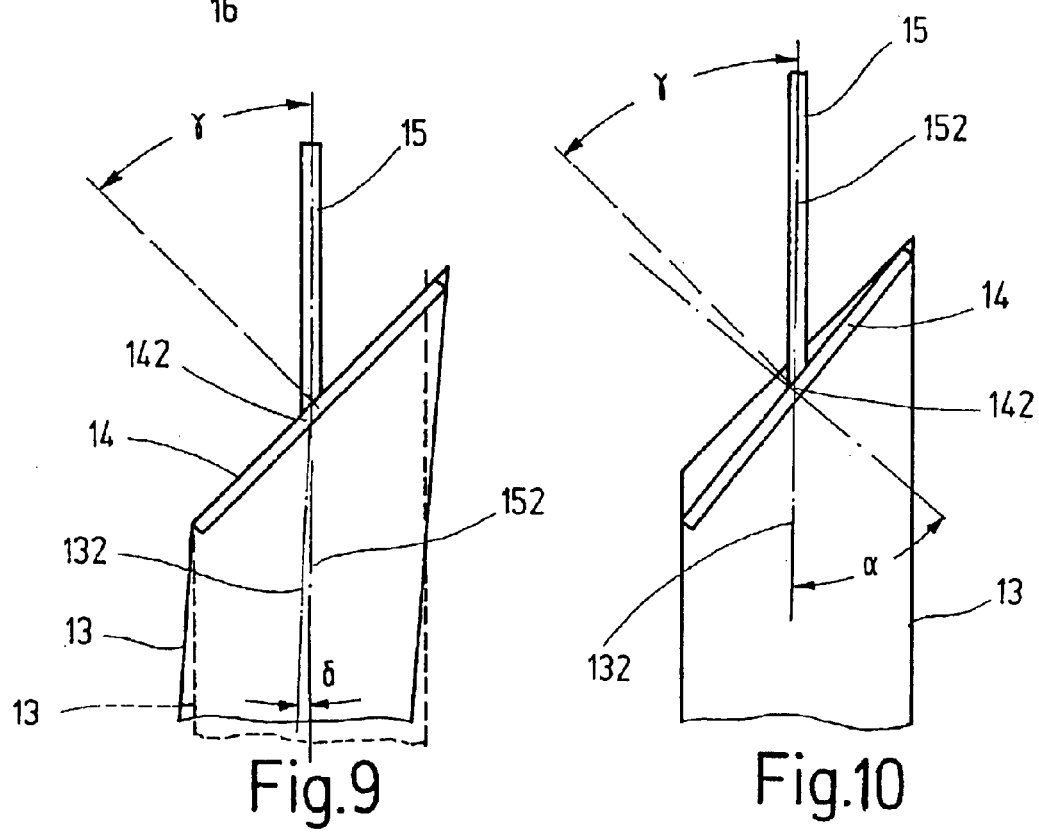

In order to produce a high degree of tightness, which requires that the valve tube 13 conform to the valve flap 14 in a sealed fashion, the flap geometry, i.e. the outer dimensions of the valve flap 14, is selected to be slightly larger than the inner geometry of the tube, i.e. the dimensions of the inner tube cross section in the closing region of the valve flap 14, so that when the flap valve 10 closes, i.e. when the valve flap 14 rotates into the valve tube 13, a deformation of the valve tube 13 toward the flap contour occurs. At the same time, during the closing process, due to the fact that the valve flap 14 is rotating further into the valve tube 13, the valve tube 13 is tilted around the intersecting point of the tube axis 132 and the axis 152 of the flap shaft 15, as shown in FIG. 9. The intersecting point coincides with the pivoting point 142 of the valve flap 14 at the front end of the flap shaft 15.

FIG. 9 shows a detail of the valve tube 13 in its tilted position in which it is tilted by the tube inclination angle $\delta$, for example 5° in the exemplary embodiment, which is shown in exaggerated fashion; the untilted valve tube 13 whose alignment is unchanged in relation to FIG. 1 is shown tilted with dashed lines. As is clear, the tilting increases the tube cross section available for the valve flap 14 to rotate into, thus preventing the valve flap 14 from becoming mechanically jammed in the valve tube 13. The valve flap 14 can always spin, despite having a larger flap contour than the tube contour. This simplifies the controllability of the flap valve 10 and prevents the flap valve 10 from mechanically jamming due to manufacture-induced dimensional fluctuations. The flap contour depends on the flap inclination angle $\alpha$; as the flap inclination angle $\alpha$ decreases, the flap surface area decreases, but the engagement point of the tilting force on the tube 13 is shifted into the inside of the tube, which means that a greater tilting force is required to tilt the valve tube 13 around the intersecting point and therefore results in a certain sluggishness of the valve actuation in the vicinity of the closed position. The outer contour of the valve flap 14 is advantageously matched to tube 13 so that the area of the valve flap 14 projected onto the inner tube cross section 135 forms a circle whose diameter is equal to the inner tube diameter of the valve tube 13 or sequentially deviates from the inner tube diameter by no more than 20%.

In order for the thin-walled valve tube 13 to be able conform to the valve flap 14 in the closed state, the wall thickness of the valve tube 13 should not be too great and the inner diameter of the valve tube 13 should not be too small. By contrast, for strength and oscillation reasons, the wall thickness of the valve tube 13 should not be too small and the diameter of the valve tube 13 should not be selected as too large. An optimization of these contrasting requirements is achieved with an inner diameter of the valve tube 13 between 5 mm and 200 mm and a wall thickness of the valve tube 13 between 0.05 mm and 2 mm.

In the embodiment of the flap valve 10 with a larger flap geometry than tube geometry, instead of the valve tube 13 being able to tilt, the valve flap 14 can also be provided with an ability to tilt in relation to the flap shaft 15, as illustrated in FIG. 10. In this instance, the elastically deformable valve tube 13 is embodied as rigid, i.e. unable to tilt, whereas the valve flap 14 is designed to tilt at the pivoting point 142. In lieu of or in addition to the valve flap 14 being able to tilt, the flap contour can also be embodied as thin-walled. The elliptical area of the valve flap 14 is greater than the inner cross sectional area of the valve tube 13 enclosed by the tube edge 131 at the inclined tube end. When the flap valve 10 is open, the valve flap 14 has moved partially out of the valve tube 13 and the valve flap 14 has an inclined position shown in FIG. 1 in which the shaft inclination angle $\gamma$ between the plane normal of the valve flap 14 and the axis 152 of the flap shaft 15, i.e. the inclination of the valve flap 14 in relation to the flap shaft 15, $\gamma=45°$. During the closing process, the valve flap 14 rotates increasingly into the valve tube 13; due to the larger flap geometry, a deformation of the valve tube 13 occurs and at the same time, the valve flap 14 tilts around its pivoting point 142 on the flap shaft 15 or is deformed. In the closed position of the flap valve 10 shown in FIG. 10, the valve flap 14 is maximally tilted and the shaft inclination angle $\gamma$ has increased from 45° to 48° in the exemplary embodiment; the valve flap is therefore more steeply inclined in relation to the valve shaft 15 and has a greater flap inclination angle $\alpha$, i.e. is more steeply inclined in relation to the tube axis 132 of the rigid valve tube 13. (When the axis 152 of the flap shaft 15 coincides with the tube axis 132, the flap inclination angle $\alpha$ and the shaft inclination angle $\gamma$ are always the same.) As is clear, the tilting of the valve flap 14 reduces the flap area rotating into the tube cross section so that here, too,—as described above—the valve flap 14 can be spun without catching in the valve tube 13. When rotating out of the closed position, the valve flap 14 once again tilts into its original position in which $\gamma=45°$.

The same effect can be achieved merely through the flexibility of the valve flap 14, without it also having to be designed to tilt around the pivoting point 142. In this instance, the region of the valve flap 14 pivoting into the valve tube 13 is elastically deflected by the rigid valve tube 13 so that the flap area projected onto the tube cross section is likewise reduced. It is possible to embody both the valve tube 13 and valve flap 14 so that they can tilt in the manner described. The above-described effects complement one another and result in an extremely smooth-running, tightly sealing flap valve 10.

The valve flap 14 and/or the valve tube 13 can be made of plastic, thermoplast, duroplast, or elastomer, and when geometrically embodied in a corresponding fashion, can function as sealing elements. Both components can also be manufactured using two-component technology. It is also possible to manufacture the valve flap 14 or valve tube 13 out of metal or ceramic.

If the valve flap 14 is made of an elastomer, then instead of the flexible valve tube 13, a rigid valve tube can also be used, without increasing the closing moment of the flap valve. It is also possible to provide the at least approximately elliptical valve flap with different flexible elements so that these elements can produce a seal, both with a rigid valve tube and with a flexible, thin-walled valve tube.

The above-described flap valve 10 has the advantage that the described construction minimizes the danger of mechanical jamming since possible dimensional fluctuations of the valve flap 14 have less of an effect due to the inclined position in relation to the valve tube 13. The bellows-like tube section 134 of the valve tube 13 also encourages an inclination or tilting of the valve tube 13 and consequently an improved enclosing of the valve flap 14. A mechanical stop for establishing the closed position of the valve flap 14 is superfluous in the above-described flap valve 10.

When there are low requirements with regard to the tightness of the flap valve 10, the outer contour of the valve flap 14 can be selected to be the same or smaller than the contour of the inner cross section of the tube in the closing region of the valve flap 14 in order to further reduce the closing moment of the flap valve 10.

Figure 8:
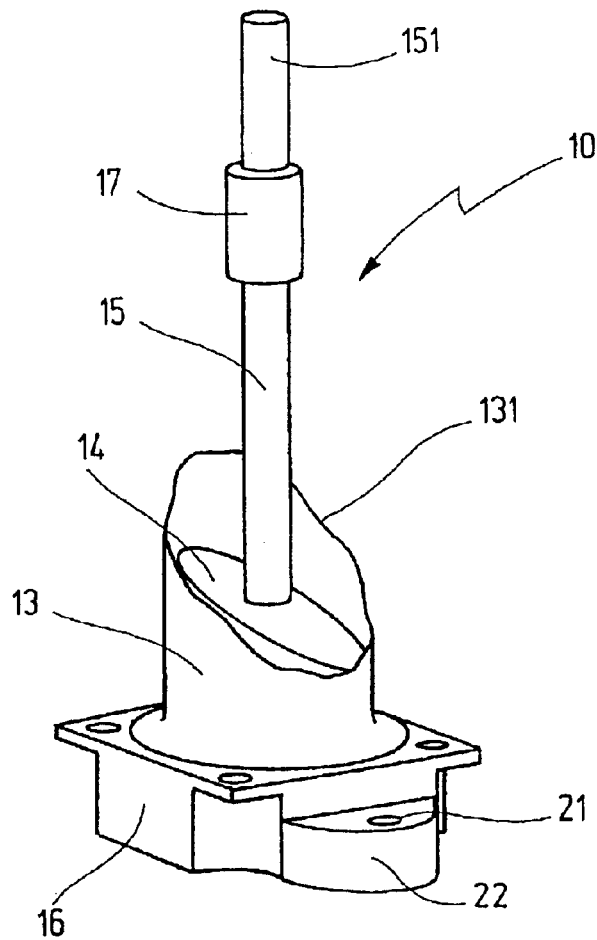
FIG. 8 shows a perspective depiction of another exemplary embodiment of the flap valve, and FIGS. 9 and 10 each show a design of the flap valve according to FIGS. 1 to 4, to illustrate the tilting capacity of the valve tube (FIG. 9) and the valve flap (FIG. 10).

The control characteristic curve of the flap valve 10 can be changed by embodying at least part of the inclined tube edge 131 in an undulating fashion. In the exemplary embodiment of the flap valve 10 shown in FIG. 8, the entire circumferential tube edge 131 has an undulating shape. Through an appropriate embodiment and placement of the raised areas and recesses on the tube edge 131, the unblocked open cross section of the flap valve 10 can be changed in the desired fashion by means of the pivoting path of the valve flap 14 and the rotation angle of the flap shaft 15. A further influence on the characteristic curve is exercised a through relative rotation of the valve tube 13 and the valve flap 14 on the intake tube 11.

The invention is not limited to the exemplary embodiments described. The entire valve tube 13 does not have to be embodied as flexible or elastically deformable. It is sufficient if this embodiment of the valve tube 13 is provided in the closing region of the valve flap 14; the flexible region can extend to the inclined tube edge 131.

The foregoing relates to preferred exemplary embodiments of the invention, it being understood that other variants and embodiments thereof are possible within the spirit and scope of the invention, the latter being defined by the appended claims.

I claim

1. A flap valve for controlling a gas flow, comprising:
a valve tube (13) that conveys the gas flow
a controllable tube cross section (135),
a valve flap (14), disposed in the valve tube (13), the valve flap (14) being non-rotatably supported on an adjustable flap shaft (15) and supported to be pivoted between an open position that maximally unblocks the tube cross section (135) of the valve tube (13) and a closed position that blocks the tube cross section (135), and
a tube end of the valve tube (13) is inclined so that a tube edge (131) of the tube end is essentially disposed in a plane extending at an acute tube inclination angle ($\beta$) in relation to the tube axis (132) of the valve tube (13),
the valve flap (14) having an at least approximately elliptical outer contour and being disposed in the valve tube (13) in the region of the inclined tube end so that a tube normal (20) of the valve flap (14) encloses an acute flap inclination angle ($\alpha$) with the tube axis (132).

2. The flap valve according to claim 1, wherein the valve tube (13), at least in the region of the inclined tube end, is embodied as at least partially flexible.

3. The flap valve according to claim 1, wherein the valve tube (13), at least in the region of the inclined tube end, is embodied so that it can tilt in relation to the flap shaft (15).

4. The flap valve according to claim 1, wherein the valve flap (14) is embodied as at least partially flexible.

5. The flap valve according to claim 1, wherein the valve flap (14) is embodied so that it can tilt in relation to the flap shaft (15).

6. The flap valve according to claim 1, wherein the valve flap shaft (15) is inclined at an acute shalt inclination angle ($\gamma$) in relation to the plane normal (20) of the valve flap (14).

7. The flap valve according to claim 6, wherein the axis (152) or the flap shaft (15) coincides with the tube axis (132).

8. The flap valve according to claim 1, wherein the valve flap (14) is fastened to one end of the flap shaft (15).

9. The flap valve according to claim 8, wherein a pivoting point (142) of the valve flap (14), which point is established by the flap shaft (15), is spaced apart from the inclined tube end by such a distance that the edge point (143) of the outer contour of the inclined valve flap (14), which point is located the furthest forward toward the inclined tube end, protrudes beyond the furthest recessed edge point (133) of the inclined tube edge (131) in all pivot position of the valve flap (14).

10. The flap valve according to claim 1, wherein the flap inclination angle ($\alpha$) can be freely selected from between 1° and 89°.

11. The flap valve according to claim 1, wherein the tube inclination angle ($\beta$) can be freely selected from between 3° and 85°.

12. The flap valve according to claim 1, wherein the flap inclination angle ($\alpha$) and the tube inclination angle ($\beta$) can be freely selected independently of each other.

13. The flap valve according to claim 1, wherein the outer contour of the valve flap (14) is matched to the valve tube (13) so that the area of the valve flap (14) protected onto the inner tube cross section forms an approximate circle whose diameter does not deviate by more than 20% from the inner diameter of the valve tube (13) and is preferably equal to this inner diameter.

14. The flap valve according to claim 1, wherein the valve flap (14) has a convexly curved edge surface (141) that determines the outer contour.

15. The flap valve according to claim 1, wherein the valve tube (13) is embodied as elastically deformable, at least in the closing region of the valve flap (14).

16. The flap valve according to claim 1, wherein the valve tube (13) is embodied as thin-walled, at least in the closing region of the valve flap (14).

17. The flap valve according to claim 1, wherein the valve tube (13) has an inner diameter between 5 mm and 200 mm and a wall thickness between 0.05 mm and 2 mm.

18. The flap valve according to claim 1, wherein, in the closing region of the valve flap (14), the valve tube (13) has an inner contour whose dimensions are slightly smaller than the dimensions of the outer contour of the valve flap (14).

19. The flap valve according to claim 1, wherein, in the closing region of the valve flap (14), the valve tube (13) has an inner contour whose dimensions are equal to the dimensions of the outer contour of the valve flap (14).

20. The flap valve according to claim 1, wherein, in the closing region of the valve flap (14), the valve tube (13) has an inner contour whose dimensions are slightly greater than the dimensions of the outer contour of the valve flap (14).

21. The flap valve according to claim 1, wherein in the tube section (134) spaced apart from the inclined tube end, the valve tube (13) is embodied so that it undulates in a bellows-like fashion.

22. The flap valve according lo claim 1, wherein at least part of the tube edge (131) of the inclined tube end is embodied so that it undulates.

23. The flap valve according to claim 1, connected as an exhaust return valve in an exhaust return line of an internal combustion engine.

24. The hap valve according to claim 1, connected in the air supply line of an intake section of an internal combustion engine.

* * * * *

UNITED STATES PATENT AND TRADEMARK OFFICE
CERTIFICATE OF CORRECTION

PATENT NO.    : 6,843,467 B2                                            Page 1 of 1
DATED         : January 18, 2005
INVENTOR(S)   : Uwe Knauss It is certified that error appears in the above-identified patent and that said Letters Patent is hereby corrected as shown below:

Title page,
Item [56], References Cited, U.S. PATENT DOCUMENTS, please add the following:
-- 4,241,704  A        12/1980      Yasuhiko........................... 123/432

FOREIGN PATENT DOCUMENTS
WO 99/67520 A      12/1999
GB  759,111        10/1956
EP  0 791 734 A2    8/1997
EP  1 115 991 A     7/2001 --

Signed and Sealed this

Fifth Day of April, 2005

JON W. DUDAS
*Director of the United States Patent and Trademark Office*